(12) United States Patent
Merwin et al.

(10) Patent No.: US 7,706,989 B2
(45) Date of Patent: Apr. 27, 2010

(54) METHODS FOR DETECTING FLUID SURGE CONDITIONS

(75) Inventors: Jeffrey C. Merwin, St. Charles, MO (US); Roberto Zarate, Chersterfield, MO (US)

(73) Assignees: Potter Electric Signal Company, LLC, St. Louis, MO (US); Taco, Inc., Cranston, RI (US)

( * ) Notice: Subject to any disclaimer, the term of this patent is extended or adjusted under 35 U.S.C. 154(b) by 13 days.

(21) Appl. No.: 12/099,908

(22) Filed: Apr. 9, 2008

(65) Prior Publication Data

US 2008/0189058 A1    Aug. 7, 2008

Related U.S. Application Data

(60) Division of application No. 11/970,398, filed on Jan. 7, 2008, now Pat. No. 7,630,839, which is a continuation of application No. 11/376,672, filed on Mar. 15, 2006, now Pat. No. 7,317,993.

(51) Int. Cl.
  *G01F 23/00* (2006.01)
  *G01N 11/00* (2006.01)
(52) U.S. Cl. .......................................... 702/55

(58) Field of Classification Search .................. 702/50, 702/52, 53, 55, 100; 73/53.04, 149, 290 R, 73/291, 304 R; 137/386, 399, 588
See application file for complete search history.

(56) References Cited

U.S. PATENT DOCUMENTS

| | | |
|---|---|---|
| 5,600,997 A | 2/1997 | Kemp et al. |
| 6,904,800 B2 | 6/2005 | Merwin |
| 7,317,993 B2 | 1/2008 | Merwin et al. |
| 7,630,839 B2 * | 12/2009 | Merwin et al. ............... 702/55 |
| 2006/0152225 A1 | 7/2006 | Thomson |
| 2008/0109176 A1 * | 5/2008 | Merwin et al. ............... 702/55 |

* cited by examiner

*Primary Examiner*—Michael P Nghiem
(74) *Attorney, Agent, or Firm*—Lewis, Rice & Fingersh, L.C.

(57) ABSTRACT

Systems and methods for evaluating probe signal level readings in a manner that allows a low water detector to distinguish between a probe that is under a fluid level, or is above the fluid level and either being splashed or is within a foam. Low water detectors which utilize these systems and methods are also provided. The detectors generally utilize a representative probe reading, and a dynamic indicator between probe readings, for a set of probe readings taken in a time period to detect low water levels, foam, or surge.

4 Claims, 7 Drawing Sheets

METHODS FOR DETECTING FLUID SURGE CONDITIONS

CROSS REFERENCE TO RELATED APPLICATION(S)

The application claims priority to and is a Divisional of U.S. patent application Ser. No.: 11/970,398 now U.S. Pat. No. 7,630,839, filed Jan. 7, 2008 and currently pending, which is in turn a Continuation of U.S. patent application Ser. No. 11/376,672 filed Mar. 15, 2006, now U.S. Pat. No.: 7,317, 993. The entire disclosure of both documents is herein incorporated by reference.

BACKGROUND OF THE INVENTION (1) Field of the Invention

The present invention relates to a fluid detector which can differentiate between liquid fluid and foam, bubbles, or surges of the fluid; more particularly, it is to a device generally used to detect a low water condition in a boiler system (2) Background of the Invention Boilers have been used for generating steam in radiant heating systems in both residential and commercial applications for a number of years. The systems generally operate by heating boiler water to produce steam. The steam is then distributed through a piping system and radiators to heat the facility. Once distributed to radiators, the resultant steam condenses and returns to the boiler to be heated again and redistributed.

Steam boiler systems can be damaged if they have too much water or if foaming occurs within the boiler. In either case, since steam exits the boiler at high velocities, it can propel liquid water from the boiler into the piping system. This condition, known to the industry as priming, occurs when the high-velocity steam drives slugs of water through the piping system and equipment. When these slugs of water impact heating system components, it causes water hammer which can lead to damage of piping, valves, or heating system components such as radiators. When foaming occurs in a steam boiler, priming becomes a more frequent condition. For these reasons, boiler systems are filled to their desired water level during installation and steps, such as cleaning the boiler and piping or chemical treatments, are taken to control foaming in the boiler.

Because of the way these boiler systems operate, it is also necessary that there be sufficient water in the boiler system at all times. If the water level drops too low, the water in the boiler can flash to steam explosively, seriously injuring or killing people or damaging the boiler, facility or both. Boilers generally include a Low Water Cutoff (LWCO) which will serve to turn off the heat source for the boiler if the water level drops below a predetermined safe level. The LWCO therefore serves as a defense against the system being operated with insufficient water and indicates when additional water needs to be added.

There are many types of different systems used in an LWCO to detect the low water condition. In the simplest example, a simple float switch may be used. Historically, these float style LWCO devices function reliably, so long as they receive proper daily or weekly maintenance like blowdown to remove deposits that can cause moving parts to get stuck in a position that falsely indicates a proper water level. Since maintenance is often not performed regularly or sometimes not performed at all, mechanical type LWCO devices are, therefore, subject to improper operation on a regular basis. For this reason, the industry has adopted more sophisticated electronic probe style LWCO devices which have no moving parts.

Probe style LWCO devices generally utilize the electrical conductivity of a fluid, in this case the boiler water, to complete an electrical circuit between two conductors of the probe. One conductor is placed low down in the tank so as always to be in fluid while the other conductor is placed at the desired minimum operating level of water. When both conductors are underwater, electric current can pass through the water between the two conductors completing the electric circuit between them and indicating a safe water level. When the level drops below the level of the upper conductor, the electric circuit is broken which indicates a low water condition.

When the fluid level is stable in the vessel and the surface line is well defined, this type of technology works quite well. In steam boiler applications, however, the stability of the water level and the definition of the water line can degrade during operation. For instance, boiling water will often surge due to heat underneath creating bubbles which pass through the water disrupting the water line. Further, differences in heat throughout the boiler water can further cause water movement which can disrupt the water line making a constantly changing water level. Under intense boiling conditions, the water line becomes very undefined, making it difficult to ascertain the actual water level.

Steam boilers also act under pressure. When the boiler has reached a desired operating pressure, it enters a relatively stable state where steam can be removed and the water boils in a fairly controlled fashion. When heating loads increase rapidly, the additional load on the boiler can result in much more steam suddenly being removed from the boiler, decreasing the pressure in the boiler. This can result in the water being heated more aggressively and boiling more violently as the pressure falls off. A violent boil of water will generally lead to a significant disruption of the water line due to splashing of the water inside the fluid vessel. Further, water which is not completely clean can generate a foam which can float on the surface of the water or even fill the inside of the boiler.

Traditional LWCO technologies generally determine the water level by examining the resistance between the two probes as a method to determine if the conductive fluid is between the probes. The strength of the LWCO signal transmitted via the boiler water is related to the amount of surface area of the probe in contact with the liquid. Therefore, in a well behaved system, as the water line slowly drops across the surface of the upper probe, the signal will decrease as resistance effectively increases. In the boiler system, however, the presence of steam bubbles within the water and an imprecise water line can lead to false readings as the surface area of the probe actually in contact with liquid water can change from instant to instant, even when the water line is significantly above the probe.

In order to prevent false indications of a low water level due to the changes in probe signal levels due to surging or bubbling, traditional low water detectors average the probe signal over a period of time, and then use the average to determine whether there has been a sufficient change over time to indicate a low water level. In the event of small changes to the average over a significant time period, the low water detector will often adjust to accept new values as the expected signal levels (or baseline) and will only trigger a low water condition in the event of a major change from that baseline. These types of systems effectively compensate for small changes in the conductivity such as through alteration of the water chemistry from interaction with the pipes.

The problem with averaging systems is that having their probe in foam or under relatively violent splashing will generally still produce an average probe signal within the period that is similar to the average probe signal when liquid is covering the probe. The alternative problem is, however, that not using the average produces a large number of false indications for low water as the water surges and bubbles during the boiling process but is still at a sufficient operating level.

To attempt to compensate for the false low water indications produced by dynamic water levels, while preventing premature restoration from a low water condition, low water cutoff devices often incorporate a delay feature that requires water to be continuously present before a low water condition is removed or continuously absent for a predetermined length of time before a low water condition is indicated. In some other systems, the low water detection system attempts to correct for dynamic effects by periodically shutting off the boiler's burner circuit and keeping it off for a predetermined duration or settling period. At the end of this period, it is presumed that the dynamic system has stabilized or settled and therefore the low water detection device can take a more accurate reading of whether it is within fluid or not.

While both these options help with the problem of inaccurate detection, numerous issues plague the methods. Requiring continuous low water indications before triggering a low water condition can often make a low water condition less detectable by making it harder to detect foam or surge which will result in less detection accuracy. Further, during a settling period, foam and steam also have an opportunity to condense and return to the boiler, replenishing the water level and possibly altering the determination. Alternatively, a heavy foam may not recondense, leaving the probe still within the foam at the end of the settling period and having the probe still generate an inaccurate reading. The short cycling of the heating cycle created by periodically turning the burner off can also cause numerous problems that lead to premature failures of the heating system resulting in potentially high repair or replacement costs. Further, the system will not be able to meet demands for heat when the shut-off period is implemented.

SUMMARY OF THE INVENTION

Because of these and other problems in the art, described herein are systems and methods related to low water detection systems, generally for use with a boiler, which provide for improved detection of low water conditions in the presence of foam or surge by having the systems utilize a dynamic indicator associated with the signals received by a conductivity type control. This dynamic indicator provides that changes to probe signal levels within a time period can be utilized to detect when the probe is within a form or surge.

There is discussed herein, amongst other things, a detector for determining when a fluid level has dropped below a prespecified level, the detector comprising: a probe placed in a fluid containment vessel; a signal generator for generating a transmitted signal, the transmitted signal passing into a fluid within the fluid containment vessel; and a processor; wherein the processor obtains a received signal detected by the probe; wherein the processor stores the received signal associated with the time segment; wherein the processor obtains and stores signals for a plurality of time segments within a time period; wherein the processor determines a representative probe signal for the time period; wherein the processor determines a dynamic indicator for the probe signals in the period; and wherein the processor uses both the representative probe signal and the dynamic indicator to determine if the probe is within the fluid.

In an embodiment of the detector the fluid container vessel comprises a boiler and the fluid comprises water.

In another embodiment of the detector the dynamic indicator is computed using a mathematical principle selected from the group consisting of: standard deviation, divided differences, absolute differences, or root mean squared and the representative signal is computed using a mathematical principle selected from the group consisting of: mean, median, or random selection. The representative signal may be used to detect when the second probe is in air while the dynamic indicator may be used to detect when the second probe is in surge or in foam.

In another embodiment of the detector, the processor is a microprocessor, may include hardware compare elements, a microcontroller, a programmable logic circuit, or a gate array.

There is also discussed herein, a method of determining when a fluid has dropped below a prespecified level, the method comprising: providing a detector having: a probe located in a fluid containment vessel; a signal generator for generating a signal; and a processor; generating a transmitted signal at the signal processor which passes into the fluid; detecting a detected probe signal at the probe during a time segment; repeating the step of detecting to collect a set of detected probe signals, each of which is associated with a different time segment within a period; determining a representative probe signal for the set of detected probe signals; determining a dynamic indicator for the set of detected probe signals; and using a combination of the representative probe signal and the dynamic indicator to determine if the probe is still within the fluid.

In an embodiment of the method, the vessel comprises a boiler and the fluid comprises water.

In another embodiment of the method in the step of using the combination of indicates that such second probe is in air, is in fluid, or is in foam.

In another embodiment of the method the dynamic indicator is computed using a mathematical principle selected from the group consisting of: standard deviation, divided differences, absolute differences, or root mean squared and the representative signal is computed using a mathematical principle selected from the group consisting of: mean, median, or random selection.

There is also discussed herein, a detector for determining when a fluid level has dropped below a prespecified level, the detector comprising: means for detecting the a signal at a fixed point in a fluid containing vessel; means for generating the signal within a fluid in the fluid containment vessel; and means for processing signals from the means for detecting; wherein the means for generating generates a plurality of signals, each of the plurality of signals being detected by the means for detecting; wherein the means for processing calculates a representative signal and a dynamic indicator for the plurality of signals; and wherein both the representative signal and the dynamic indicator are used to determine if the fluid is above the predetermined level.

There is also discussed herein, a detector for determining when a foam is present in a fluid containing vessel, the detector comprising: means for detecting the a signal at a fixed point in a fluid containing vessel; means for generating the signal within a fluid in the fluid containment vessel; and means for processing signals from the means for detecting; wherein the means for generating generates a plurality of signals, each of the plurality of signals being detected by the means for detecting; wherein the means for processing calculates a dynamic indicator for the plurality of signals; and wherein the dynamic indicator is used to determine if the means for detecting is in a foam.

DETAILED DESCRIPTION OF THE PREFERRED EMBODIMENTS

Figure 1:
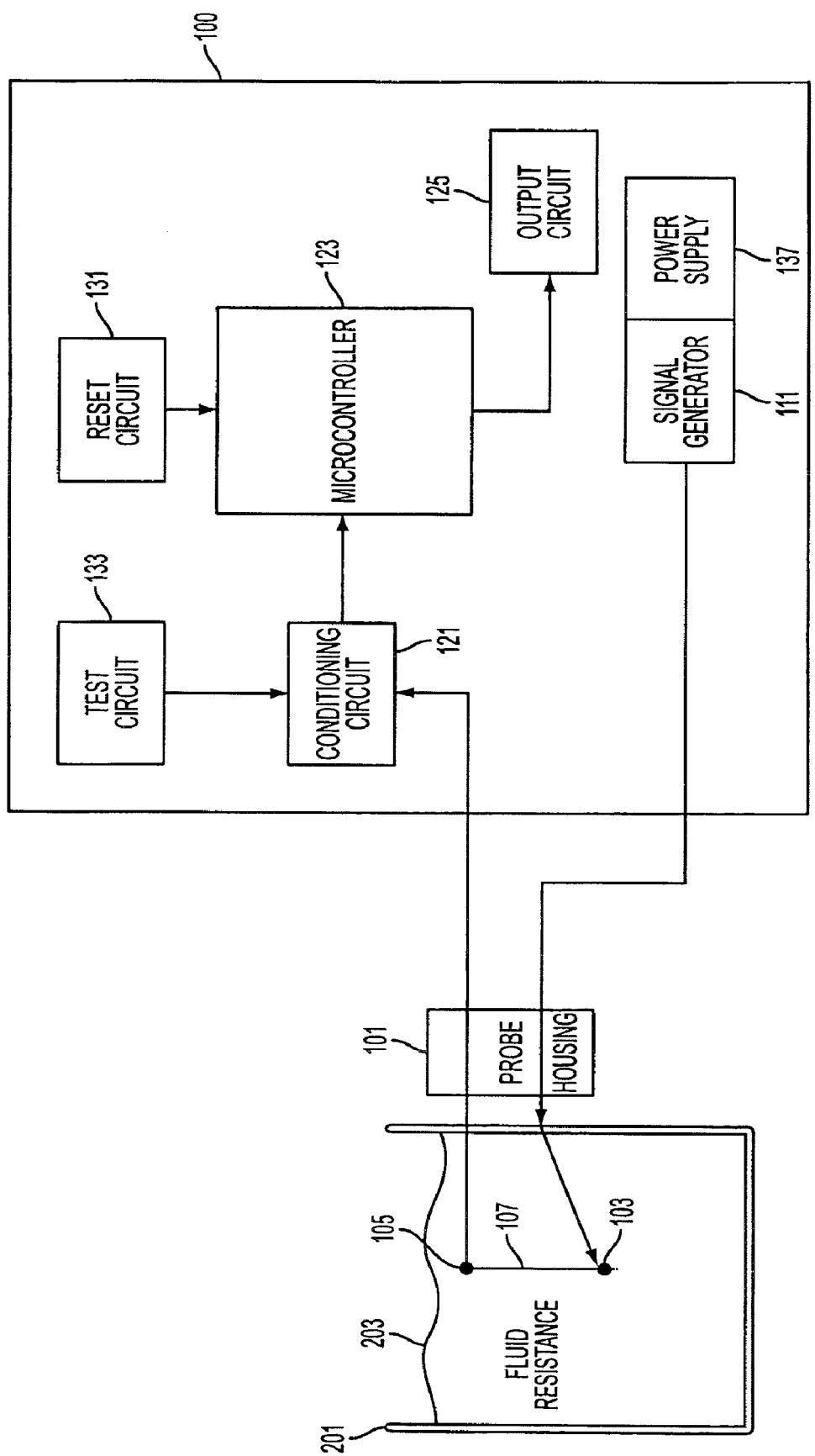
FIG. 1 shows a block diagram of a first embodiment of a foam detecting low water system.

The fluids in boiler systems are dynamic and therefore the use of water level monitoring devices which are designed to detect static or relatively well behaved fluid levels is often problematic as the controls can be fooled into detecting sufficient water levels in a system when in fact there is not due to the device's probe being splashed or in bubbles or foam. This leads to false indications of safe water levels where the probe is reading a sufficient signal level, (due to surging, bubbles, or foam), but the fluid level is really too low. Corrective methods, such as delays or shutting down the boiler heat source periodically, help reduce false indications of safe water levels. However, these methods still can be fooled into signaling safe water conditions when the water levels are not in the safe range. These false positives lead to problematic operation of the boiler, which, in turn, can lead to other undesirable conditions.

During the course of this application, the low water detection system (100) will be presumed to be used with a self contained boiler system and will be detecting the fluid level of water in the boiler. This water will generally not be pure and will in fact include a number of chemicals, such as but not limited to, oils, fluxes, corrosion treatments, or scale treatments, however, this solution will generally be referred to as water. For the purposes of this application, a water level is considered to be above the probe when the actual stable level of liquid is above the probe. That is, if the foam and surge were eliminated, without liquid returning from the steam system, the liquid would continue to cover the probe.

It would be recognized, by one of ordinary skill in the art, that the low water detection system (100) would be capable of detecting fluids other than water, if calibrated for such detection, and could also be used in conjunction with fluid vessels other than boilers, however, the low water detection system (100) is particularly valuable in the steam boiler implementation and that implementation is therefore discussed herein.

Generally, it is not necessary for the boiler to be shutoff at the instant that the water drops below the probe level. There will generally be some space between the probe level and the actual bare minimum safe operating water level of the boiler. However, it is desirable that a low water level be detected as close to the probe level as possible, without dramatically increasing the number of nuisance shutoffs when there is sufficient water in the system. The systems and methods described herein, therefore, provide for a low water detection system (100) which generally provides fewer nuisance shutoffs and minimizes false safe water level indications over systems that can not discriminate between water and the presence of surging, bubbling, or foam. Further, the systems and methods discussed herein are generally able to detect when a low water detection device's probe is in foam or surge, a situation which may provide additional valuable data regardless of the actual water level. This detection of foam or surge is not required to be absolute (e.g. the probe need not detect such foam or surge in all cases), but is capable of detecting the presence of foam or surge before traditional low water detection devices would recognize it.

FIG. 1 shows a general layout of a low water detection system (100) designed to detect water levels in a boiler (201). The low water detection system (100) is also generally able to detect the presence of foam or surge. The probe housing (101) includes two conductors or probes (103) and (105) placed into the fluid reservoir of the boiler (201). In an alternative embodiment, if the boiler (201) reservoir is electrically conductive, it can serve as the lower probe (103). When the water level is at or above the higher probe (105), as it is in FIG. 1, the fluid (203) in the boiler (201) completes the electrical circuit between the probes (103) and (105) and acts as a resistor (107). In the event that the fluid (203) also includes a foam on its surface, the foam and fluid (203) together may also act as the resistor (107). If the upper probe (105) is entirely in air, generally the circuit between the probes (103) and (105) will be broken.

A signal generator (111) generates electrical signals which travel into the lower probe (103) and interact with the resistance (107). If the upper probe (105) is not in air, a signal is usually received via the resistance (107) by the upper probe (105) and passes into a conditioning circuit (121). The conditioning circuit (121) is generally used to provide for adjustment of the sensitivity of the low water detection system (100).

Once conditioned, the signal (or lack of signal) is provided to a processor (123). The processor (123) may be any type of processor such as a microcontroller, microprocessor, or any other type of signal processor known now or later discovered. The processor (123) will determine if the upper probe (105) is underwater, in foam or surge, or in air, based on calculations from the data provided from the upper probe (105) and signal generator (111). The processor (123) will also generally maintain a history of the probe signal it receives from the conditioning circuit (121) which may be stored in a memory (not shown).

If the low water detection system (100) wishes to provide indications of current status, the processor (123) can provide an indication of status to the output circuit (125). The output circuit (125) may direct any form of enunciator whether aural, visual, tactile, or any other form to provide feedback to a human user, or, in an automated system, may control the water boiler (201) so as to switch the boiler (201) heating element on and off and/or may control a water feeder system for providing additional water into the boiler (201). The output may be provided at any and all times, may occur only when the probe (105) is in air, or may occur if the probe (105) is not in water (203), (e.g. in foam or air). The exact nature of the output will depend on the type of feedback desired by the user and the level of automation in the boiler (201) system.

The low water detection system (100) of FIG. 1 also includes a reset circuit (131) which can be used to reset the low water detection system (100) in the event of a low water condition. Boiler installation standards and codes often require the heat source of the boiler to be locked out when a low water condition is indicated until a user intervenes by pressing a manual reset button. This reset circuit can also be used after service where the water composition within the boiler has changed and the baseline values for some or all of the variables need to be reset and redetermined, however, self-calibration is generally preferred.

There is also included a test circuit (133) in the embodiment of FIG. 1. The test circuit (133) can be used to make sure that the processor (123) is triggering in the fashion desired based on the probe (105) output and results in the proper signaling to other boiler controls to properly turn off the boiler heat source. This permits users to verify system wiring and operation during inspections prior to putting the boiler into service. There is also a power supply (137) to power the low water detection system (100).

Figure 3:
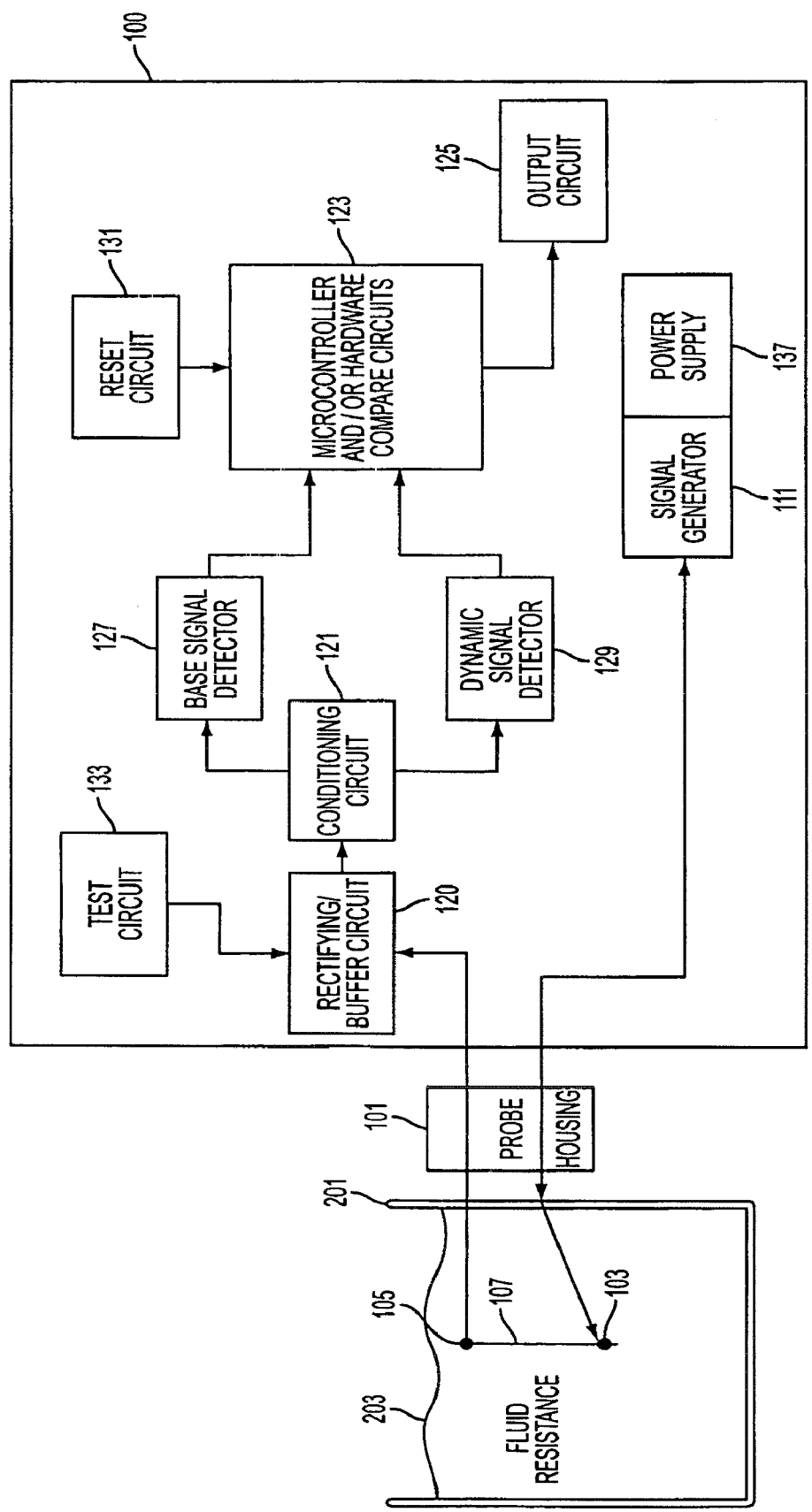
FIG. 3 shows a block diagram of a second embodiment of a foam detecting low water system.
Figure 4:
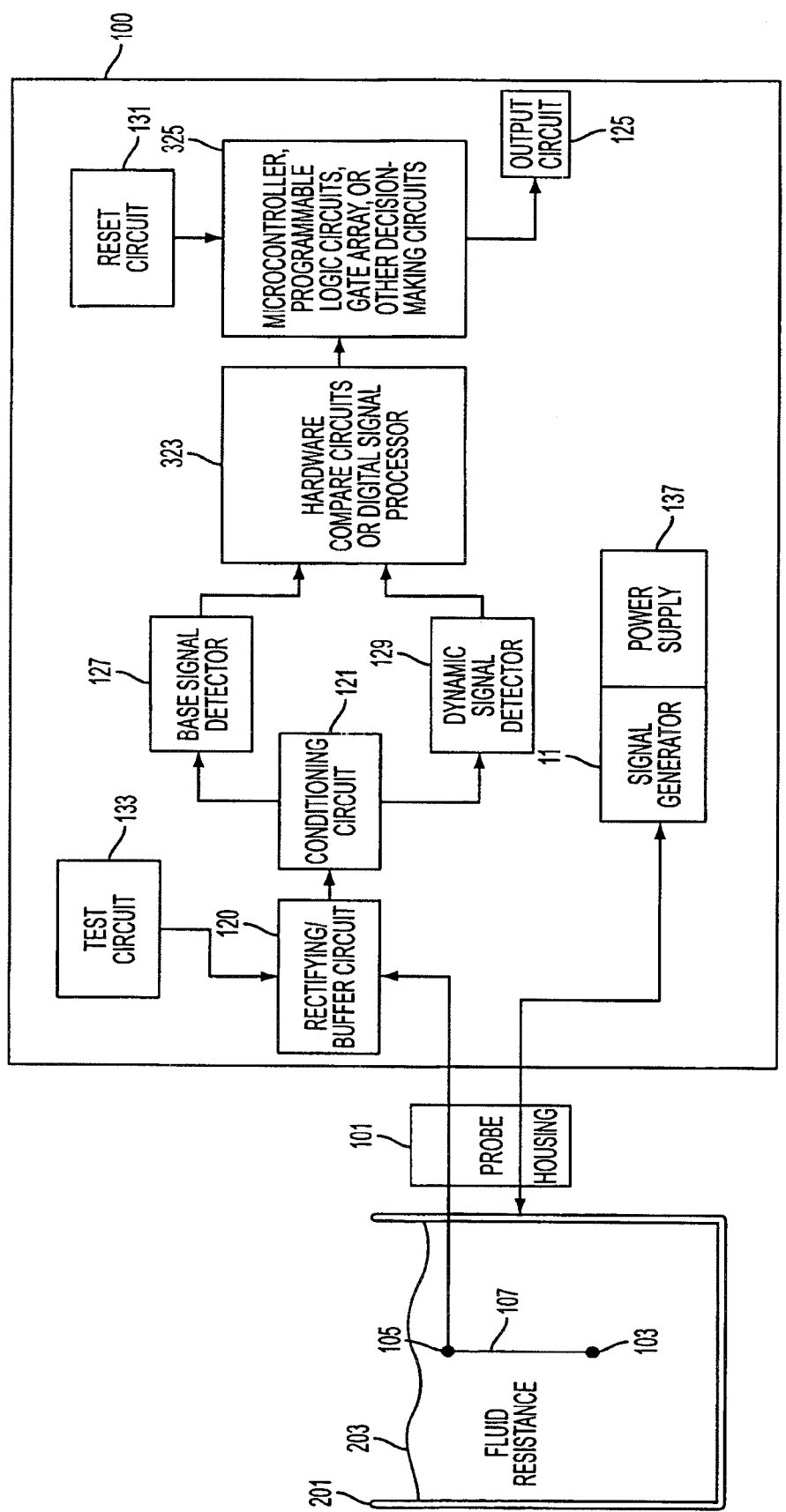
FIG. 4 shows a block diagram of a third embodiment of a foam detecting low water system.

FIGS. 3 and 4 provide for alternative embodiments of a low water detection system (100). The low water detection system (100) of FIG. 3 is of similar topology to that of FIG. 1. However, the low water detection system (100) depicted in FIG. 3 includes separate circuits prior to the processor (123) for determining the probe baseline signal (127) and detecting the dynamic indicator (129). That is, the base line detector (127) performs the processing of probe readings, (PR), that permits the processor (123) to establish the historical baseline signal while dynamic signal detector (129) provides signal processing that permits the processor (123) to determine the dynamic indicator (DI). In this way the processor (123) can act on each signal independently and is focused on determining the nature of the boiler level from these values, eliminating its need to determine the different signals on its own. One of ordinary skill in the art would understand that there are a number of different ways to implement detectors (127) and (129) such as, but not limited to, filter circuits, integrators, peak detectors, or amplifiers. The device of FIG. 3 also includes a rectifying or buffering circuit (220) to buffer later electronics from the signal and prevent damage.

In the embodiment of FIG. 3 it is also possible to allow the processor (123) to monitor the outputs of the separate circuits (127) and (129) independently. In this type of arrangement, each of the two paths incident on the processor (123) can have its circuits (and associated monitoring software) tuned for the detection of foam or water. This provides the low water detection system (100) with the ability to allow the water channel to have a small signal amplitude, such as due to buildup due to system age, corrosion, or related issues, while still allowing the low water detection system (100) to detect the presence of foam. This arrangement is beneficial in this situation because while the water channel signal is small, it is still present, and the foam channel can be specifically tuned to still detect the presence of foam (that is, the absence of water). This multichannel input approach permits the low water detection system (100) to operate in less desirable operating conditions, such as, but not limited to, those due to a poor installation, poor maintenance, or poor water quality, while still being able to reliably detect loss of water and the presence of foam and still shutdown the boiler safely, if necessary.

Figure 2:
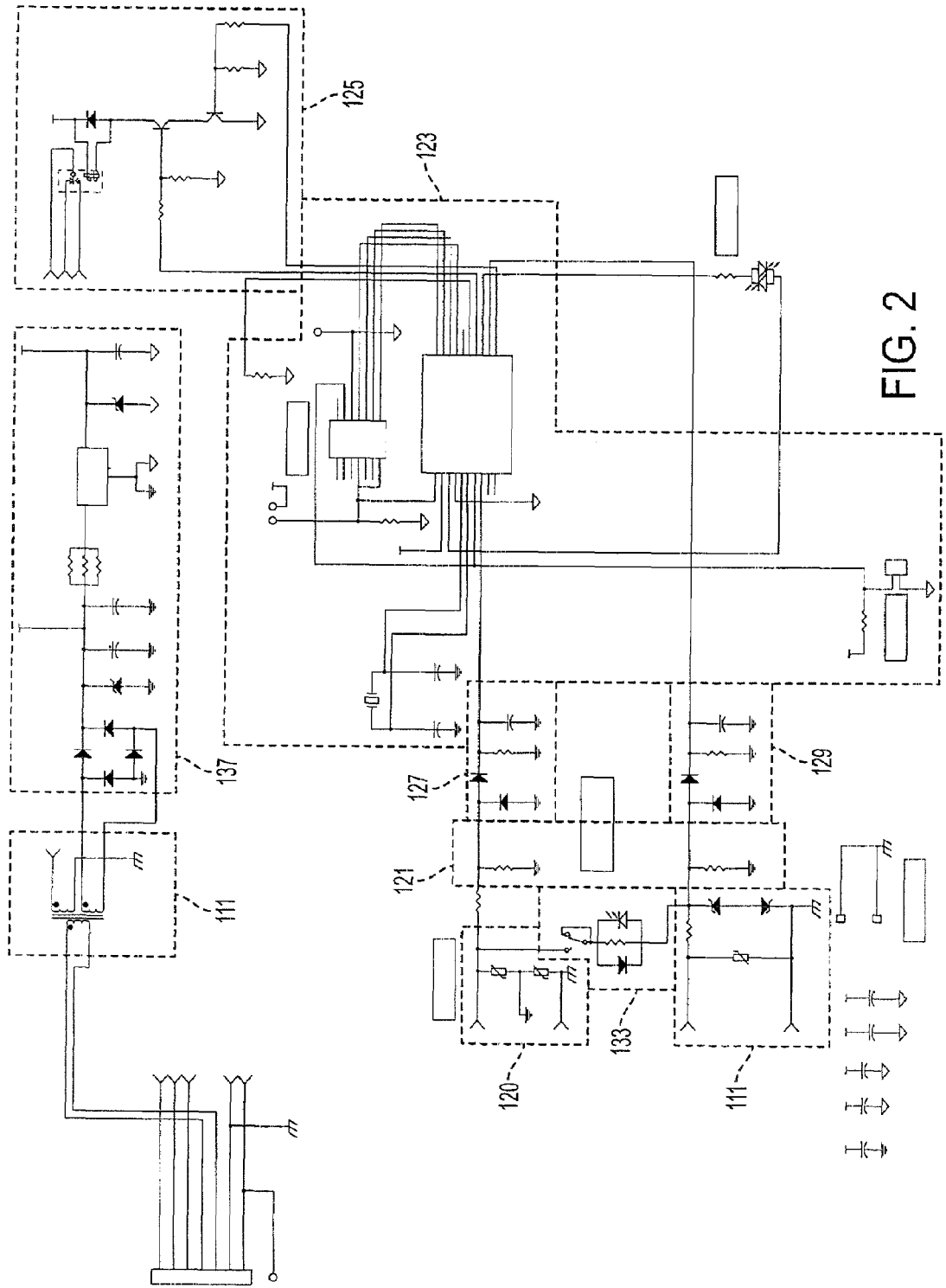
FIG. 2 shows a circuit diagram of an embodiment of FIG. 3.

FIG. 2 shows one possible circuit implementation of the block diagram of FIG. 3. This circuit design is by no means the only way to implement the low water detection system (100) of FIG. 3, but does provide for one implementation of the low water detection system (100).

FIG. 4 provides for a still further embodiment of a low water detection system (100). In the embodiment of FIG. 4, a specific processor can still be used or the function of the processor (123) can be performed by hardware circuits (323) and (325) which replace the processor. The hardware circuits (323) and (325) could comprise circuits capable of providing similar functionality to a processor such as, but not limited to, Digital Signal Processors (DSP), programmable logic circuits, or analog comparators. For the purposes of simplicity, however, herein all these processing means and systems are referred to as processor (123) whether the processor (123) is a processor, hard wire circuit, or other structure having the same functionality. It should be obvious to one skilled in the art, that this embodiment provides the structure for a hardware only design when compared to the embodiment in FIG. 1 which requires software to process and make decisions pertaining to the values of the signals the processor (123) receives.

The boiler (201) of FIGS. 1, 3 and 4 shows a well behaved and effectively static state where the fluid (203) is clearly above the higher probe (105) level. Even in a well behaved boiler (201), however, there is rarely a static fluid resistance (107). The composition of the water (203) will change over time leading to some fluctuations in the fluid resistance (107) and therefore the signal detected by the upper probe (105). Some of these fluctuations can be caused by new water being added to the boiler (201) which includes chemicals, impurities or microorganisms which alter the conductivity. Alternatively or additionally, the deposition of chemicals, scale, or sludge on the boiler's (201) surfaces can also lead to changes in fluid resistance (107) over time. Deposition, may also lead to changes in the sensitivity of the probe (105) which may become coated with material or otherwise have its electrical properties be altered by the water composition. All these changes can effect the ability of the low water detector (100) to be able to determine if a detected change in fluid resistance (107) is due to a change in the chemistry of water (203), a change resulting from deposition on the probe (105) or boiler (201), or if the change is due to liquid water (203) no longer covering the probe (105).

Changes in signal levels also occur due to dynamic water effects. There are two general types of situations where dynamic water effects can effect signal level of the probe (105). In the first situation, the probe (105) is under the water level, but rising steam bubbles or the surging effect from bursting steam bubbles can temporarily put the probe (105) into gas (air) instead of liquid. In the second case, the probe (105) is above the fluid level, but surging waves of fluid or foam formed on the surface of the fluid can act in a manner to temporarily place the higher probe (105) in a conducting situation. As should be apparent, the effects on the signal level detected by the probe (105) can be similar in both situations, however, in one situation additional water is needed while in the other it is not (and could be detrimental).

Foam formation can be particularly problematic. Scale and corrosion control is required in boilers (201) to maintain operating efficiencies and prevent premature failure of the boiler (201) and related systems. Often, these conditions are inhibited by the inclusion of chemical additives to the water to alter its pH and other chemical attributes. The resultant alteration of the water chemistry inhibits corrosion or scale formation if done correctly. However, the inclusion of chemicals, as well as dissolved solids and other naturally occurring materials in the water, can cause the water to foam when it is heated. Unclean systems and piping of poor quality can also cause foaming of the water.

Once foam begins to form, it will often be the case that a layer of foam will become present at most times on the surface of the water. It may even become so heavy as to completely fill the space in the boiler (201) above the water level. In many instances, the liquid film matrix of the foam is sufficiently conductive to allow electrical current to pass through the foam. Often in this case, the liquid surface of the foam (e.g. the bubble walls) will provide an average fluid resistance (107) similar to the liquid. This situation means that the boiler (201) water and the foam on the surface of the water may still have sufficient conductivity to produce a signal comparable to that produced by the fluid (203) alone. With enough foam being produced, this can allow the low water detector (100) to not detect a low water condition regardless of the actual level of water in the system as the probe (105) is always within the foam if not in the water. That is, there is no time or water level where the probe (105) is in the air.

Figure 5:
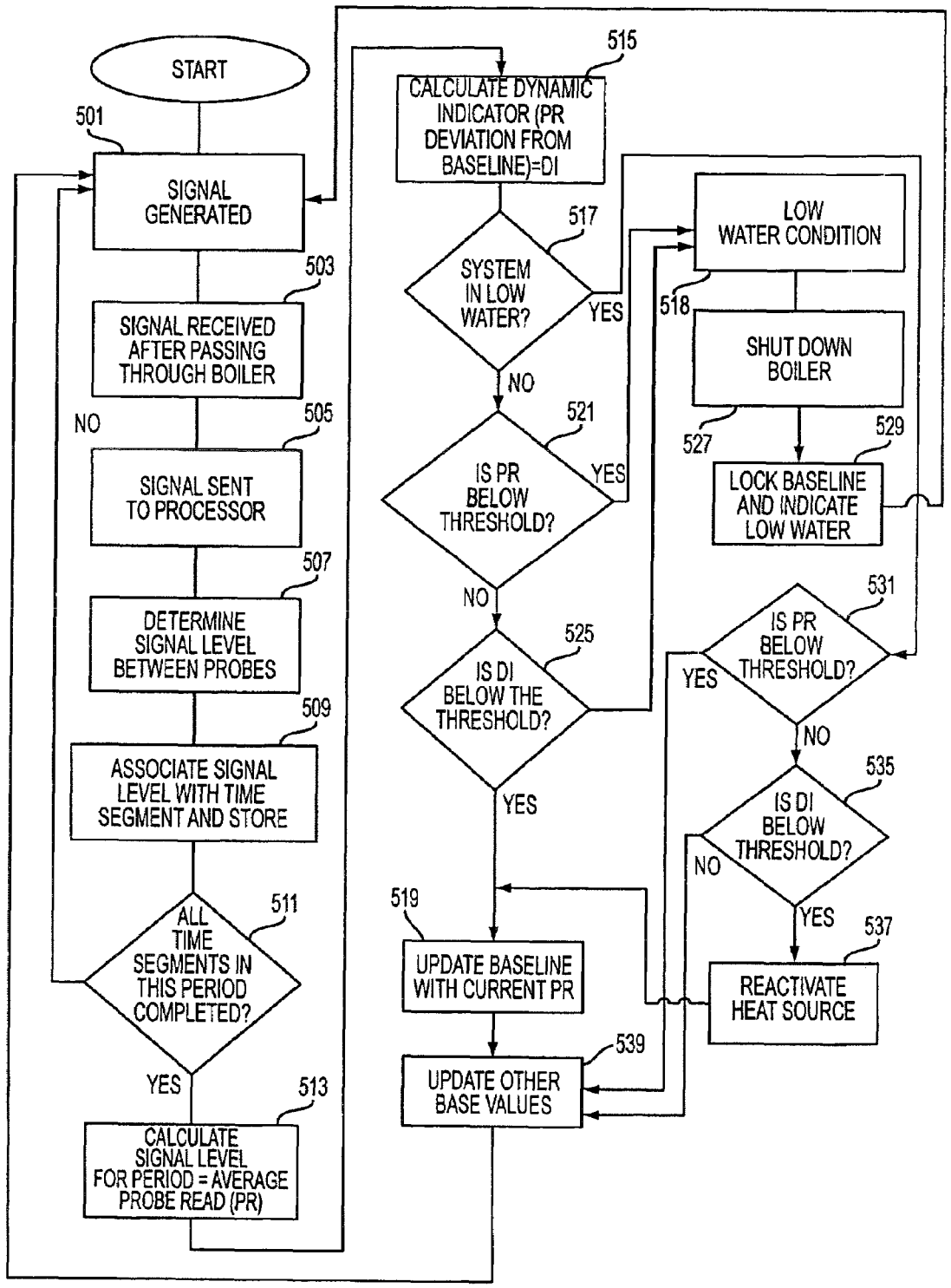
FIG. 5 provides a flowchart of steps of operation of the processor to determine if the probe is in a surge or foam situation.

FIG. 5 provides for a method of operation of a low water detection system to provide for the detection of a low water condition even in the presence of foam or significant surging. The steps of the method utilize the detector (100) of FIG. 1, however it would be apparent how similar steps would be used in the detectors of FIGS. 3 and 4. In step (501) the signal generator (111) will provide for a first signal into the fluid (203). Depending on the embodiment, the signal may be generated specifically for detection (e.g. a burst) or the signal may simply be constantly provided and measured at known intervals. In step (503) the probe (105) will measure the signal it detects. This value will then be sent to the processor (123) in step (505) passing through conditioning circuit (121) or buffer (120) if present. In step (507), the signal level received by probe (105) is determined. This determination will result in a signal level associated with a first time segment. The first time segment is a predetermined length of time during which the measurement occurred. Once determined, the signal level is associated with the first time segment and stored in step (509). In an embodiment, for example, each time segment comprises 0.05 seconds with the signal being generated and measured sometime within that segment. The process will then repeat in step (511) taking signals and recording the signal with the time segment for a number of time segments generally according to a predetermined pattern until sufficient time segments to make up a predetermined time period have passed. Once a fixed number of time segments have passed in step (511), the system will move on. Using the prior example of a time segment being 0.05 seconds, the period may be 1 second, or 20 time segments long, in an embodiment.

Once the period is complete, all the time segment signal values for the time segments in the period will now be acted on to provide for values related to the signal activity during the time period. In step (513), a representative probe signal over the time period will be determined. In effect, this step (513) assigns a single value of probe signal level to the time period based on the readings in the time segments. This may be referred to as the probe reading (or PR) during the period. Generally, the PR will be some form of average of the signal levels for the time segments within the time period. This average may be obtained in any fashion and may be the mean, median, or any other type of computed average. In an alternative embodiment, items other than an average, such as a typical reading, or even just a randomly selected reading may be used instead to provide for the PR.

To help detect dynamic effects, a second value is also calculated for the time period. This is the dynamic indicator (DI). The DI is any indicator showing the divergence or variability of the individual signal levels associated with the time segments in the period compared to the baseline value of the PR. The DI may be any indicator of divergence such as, but not limited to, the standard deviation, divided differences, absolute differences, or root mean squared of the various conductivities in the period.

In step (517), it is determined whether the system is currently indicated as already being in a low water condition. In the event that the system is currently in a low water condition, the question is whether the condition has been eliminated or is otherwise no longer valid and whether the system should be allowed to start the heat source back up again. If there is not yet a low water indication, the question is whether a low water condition now exists meaning the boiler heat source needs to be shut off. Both tests are basically similar but act differently on the boiler based on the detected state.

The PR is first compared against an absolute value (threshold) below which the water level is considered unacceptable in step (521) or (531). A PR below this level would indicate that the signal detected by the probe (105) has fallen sufficiently that the probe (105) is likely no longer in liquid water. In the event that the baseline (or PR) drops below this level, the boiler will presume a low water situation and either instigate the low water condition in step (518) or maintain the low water condition that already existed. Such a test can inhibit the baseline from dropping sufficiently slowly to not detect that the water (201) level has fallen below the probe (105) because it occurred during a series of small adjustments, or that the probe (105) has become sufficiently fouled that it may no longer be able to detect a low water condition due to a slow build-up. Such condition can therefore identify when maintenance or replacement is required as the low water detector appears to no longer be a reliable detector of a low water condition.

When the low water condition is triggered in step (518), the baseline is locked in step (529) to disallow further adjustment of the baseline to compensate for possible chemical interactions until the low water condition is perceived as having been corrected. Therefore, the baseline may not adjust during the period of a low water condition. This is a preferred action so that the baseline does not become skewed in a low water case while attempting to verify the condition. This, in turn, keeps the system from inaccurately detecting changes to the baseline leading to a false negative and restarting of the boiler in a low water situation. The boiler heat source is also shut down in step (527) when the low water condition is detected to prevent firing the boiler without sufficient water.

The PR therefore provides for the first round of tests to detect a low water condition by indicating when the probe (105) is in air. However, the PR alone is generally insufficient to detect when the probe (105) is not in water as the probe (105) may be in surge or foam which are not read as air. Dynamic effects may be hidden by the average across the time period which creates the PR value, and dynamic effects can be further attenuated into the adjustable baseline.

In steps (525) and (535), the DI for the period is compared with a DI threshold to look for an increase in the DI which is indicative of the probe (105) being in surge or foam. If the DI is below a threshold value, the probe (105) is considered to still be in liquid water (203) as the probe signal is sufficiently high to indicate that there is at least some water present and the DI is sufficiently low to indicate that the water is most likely relatively constantly covering the probe.

In the event that the readings both indicate that the probe is still in liquid water, The low water detection system (100) then cycles as being in a sufficient water condition (that is not in a low water condition). If a low water condition had previously existed, the system will reactivate the boiler in step (537) so as to return it to normal operation. Otherwise, the boiler is retained in normal operation. As part of the operation, the system will update the baseline in step (519) when normal operation is confirmed.

By maintaining a historical record of signal levels by forming the baseline, the low water detector (100) establishes the signal level that corresponds to the probe (105) being covered by water in this specific system. The baseline can then drift slightly over time depending on the age of the system and the operating conditions. For example, over time, deposits can build up on the probe's (105) surface and effect the amount of signal that the probe (105) can receive. The electronics can track these slight changes over time and adjust the baseline appropriately over time so as to compensate for decreased signal detection of the probe (105), without triggering an unnecessary low water condition. The baseline will often be an average of the PRs from across a plurality, and usually a relatively large plurality, of time periods. In this way, the baseline attenuates many more dynamic effects and better represents the "expected" PR result. At the same time, a consistent and relatively small change will allow for a delayed adjustment in the baseline to compensate for slight, but expected, changes over time.

Any other values which may be stored by the system, such as historical records of the DI or other variables or calculations may be updated in step (539). Generally, this will take place whether or not the system is in low water condition. Once the updating is completed, the cycle repeats for another period of time segments.

If the DI is above the threshold in step (525) or (535), the low water detection system (100) will presume that the upper probe (105) is now in surge (splashes) or in foam and therefore the actual water level is too low even though the PR value did not indicate the probe (105) was in air. It will therefore trigger or maintain the possible low water situation of step (518). To determine if the DI is above the threshold, a variety of comparisons may be used with the DI and the threshold. In the simplest form, the DI may simply be compared to a preset constant value. In an alternative embodiment, the comparison of step (525) or (535) compares the DI to values of a DI baseline formed from the DI of other periods. In this embodiment a sufficient absolute or percentile rise in the DI between the computed periods may be used to detect foam or surge.

In a still further embodiment, the values of the DI can be integrated within a time window so that a total amount of space under the DI curve could be used instead of the actual DI value. This could then be compared to a prior window which underwent a similar integration, looking for a percentage of increase of the DI integration or simply for an increase of a certain amount. Alternatively, the integrated value could be compared to an absolute value to determine if the DI within the window is showing a certain level of variation.

Regardless which of these methods is used, if the DI exceeds the threshold, the low water detection system (100) will act as though a possible low water situation exists in step (518). In the depicted embodiment, regardless of which test triggered it, the indication of a possible low water situation in step (518) results in the low water detector (100) shutting off the boiler (201) heating element in step (527) and locking of the baseline in step (529) as discussed above. In another embodiment, the low water detection system (100) may also trigger a water addition cycle, alarm cycle, or similar process in conjunction with the boiler shutdown. In a still further embodiment, if a sufficient number of steps to test for low water have been performed with each consistently reading low water, the low water detection system may eventually reach a threshold where it is determined that the low water is the actual condition, and additional processes, such as an alarm or water addition step may be performed.

Figure 6:
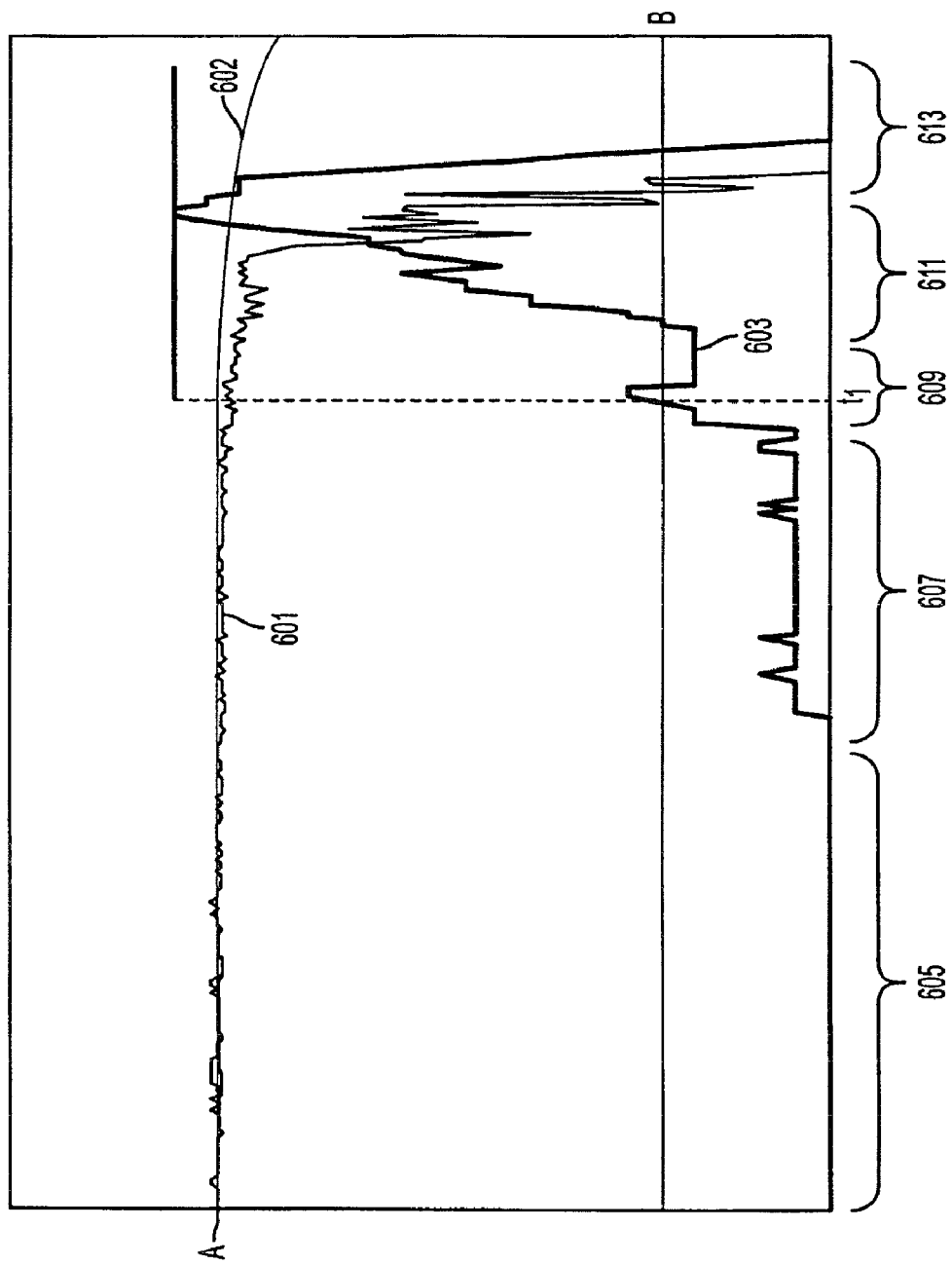
FIG. 6 is a graph showing the change of a dynamic indicator (DI) and probe reading (PR) when a probe drops from water into surge and then shuts off in a relatively clean system.

FIG. 6 shows a graph illustrating the values of an exemplary detector and the changes in the DI and PR during various stages of the process as discussed in FIG. 5. The water used in the boiler of this example, on which the graph of FIG. 6 is based, was clean and therefore most of a false water level signal will be generated from surging as opposed to foam. The line (601) shows the signal level (PR) as received by the probe over time with the line (602) being the computed baseline from historical averages of current PR values. The line (603) shows the DI value as recorded for the same periods. The low water detector (100) and boiler (201) was purposefully set up so that the boiler (201) started with a significant amount of water above the low water cutoff point (the location of the upper probe (105)) but consistently lost water over time until the low water condition was detected by the low water detector (100). The low water detector (100) then shut off the boiler heating element, but continued to take regular measurements.

The system began with the water level above the probe (105) and as can be seen in FIG. 6, the DI line (603) quickly levels out to a virtually zero reading while the PR line (601) levels out at a signal level of A which becomes the baseline (602). The graph is generally discussed by activity of DI during time divisions which are selected purely to illustrate various boiler conditions.

During the first time division (605), the water level, while falling, is still consistently above the probe (105) and as can be seen the DI (603) and PR (601) values are both fairly level around their original starting points and the baseline (602) is close to horizontal. During this time period the water is boiling and surging as steam is produced. During the next time division (607), the water level is approaching the probe (105) level. Therefore, even though the probe (105) is still mostly underwater and the PR is essentially unchanged, the boiling and surging of the water is beginning to result in some dynamics in the signal as shown by the slight rise visible in the DI (603). These dynamics are the resultant signal variations from the changes in the surface area of the electrode that is in contact with the water and walls of bubbles and foam.

In time division (609) the DI (603) suddenly jumps significantly. During this time division (609), the water level falls sufficiently below the probe (105) that the signal level has become sufficiently dynamic to result in the detection of boiling, foaming, or surging sufficient to indicate that the probe is no longer in the water. At the time $t_1$, the low water detection system (100) cuts off the heat source to the boiler upon the determination that the system is below the desired water level as the DI has passed the threshold value of B. As should be seen at time t, the PR is still virtually identical to the original PR and has not yet indicated a low water level. At the time $t_1$, the water level is below the probe level and the low water detector correctly indicates a low water situation. Traditional low water detection devices, relying only on the PR, would fail to cut off the boiler heat source at this point in time and would permit continued, unsafe boiler operation as the PR test has not yet indicated the low water condition.

While the boiler heat source is shut off at time $t_1$, the water in the boiler continues to boil (and drain) and measurements are still taken for a significant period of time due to accumulated heat already in the heat exchanger and fluid. This is shown in time division (611). It should be apparent that the further into this period that is examined, as the PR and baseline drop, their dynamic properties, indicated by DI, increase. However, it is quite clear that an amount of time passes after shutoff, $t_1$, where the PR value still indicates a sufficient signal level that would fool controls that do not monitor the dynamic properties of the water level.

In time division (613) the PR has dropped to zero indicating that there is now no water in contact with the probe (105) and the DI has risen to astronomical levels only to fall off once the probe is completely out of the water. At the end of this time division (613), the water level has effectively stabilized and is now displaying a stable water line as the system unambiguously detects that the probe (105) is only in air from the PR value. It is not until the water level has reached this dangerously low level where traditional low water cutoff could begin to respond to the loss of probe signal levels.

The graphical display of FIG. 6 shows how the systems and methods discussed herein can detect a low water condition long before the condition would be caught by a more traditional low water cutoff relying solely on the PR value. At the time of boiler shutoff and even for some time after, the PR still appears relatively constant and traditional probes which rely solely on the PR would still indicate that the water level is sufficient. By monitoring the dynamic characteristics of the PR signal, the current low water detection system (100) promptly detects the operation of the boiler with insufficient water and shuts down the boiler heat source before an unsafe condition exists.

Figure 7:
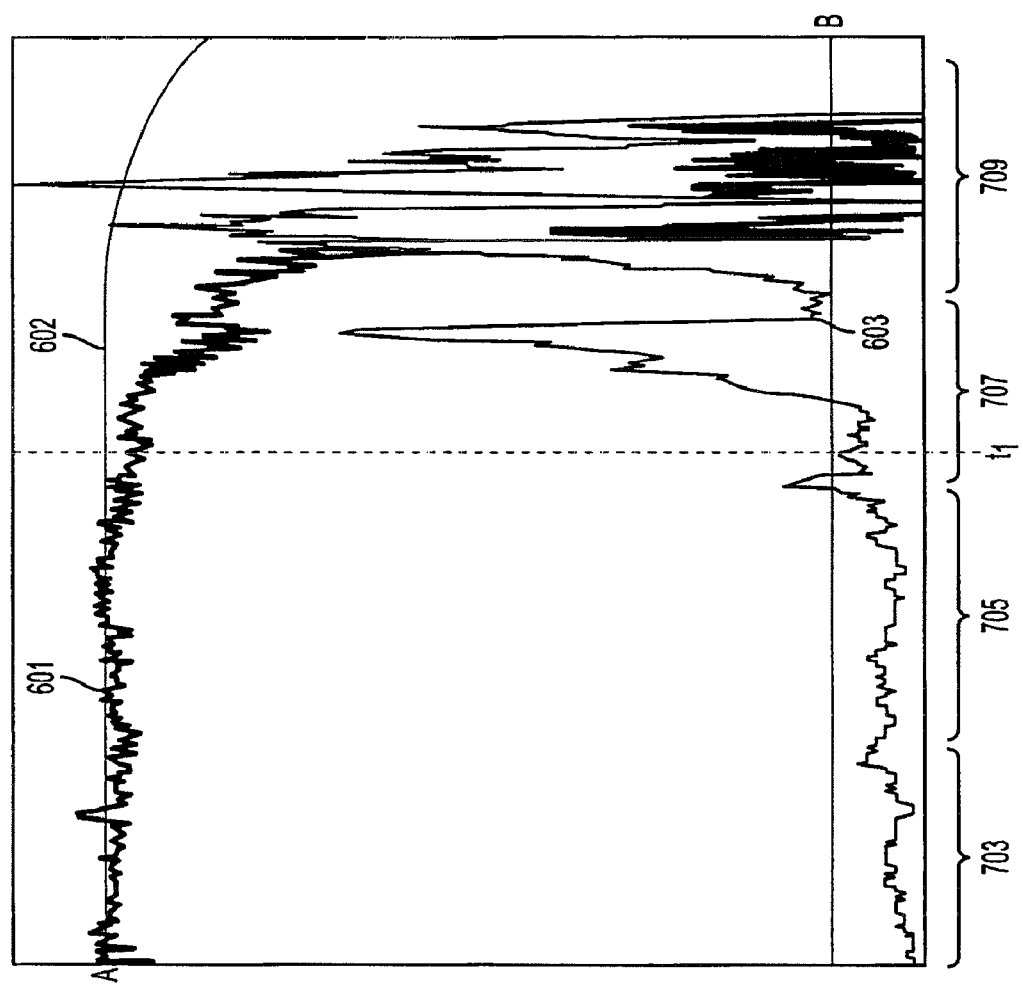
FIG. 7 is a graph showing the change in dynamic indicator (DI) and probe reading (PR) when a probe drops from water into foam and then shuts off in a relatively dirty system.

FIG. 7 shows a similar situation except the water in the boiler is very dirty (oily) and therefore instead of the probe (105) being as much in surge, the probe (105) is instead in foam. Water that contains even the slightest amounts of oil will heavily foam. This graph, therefore, indicates a potentially harmful boiler situation even if the water level is technically above the probe due to the presence of the foam possibly leading to priming. Again the boiler (201) begins with sufficient water and has a small leak introduced to slowly reduce the water to below the probe (105) level. In FIG. 7, however, the boiler (201) was not allowed to shut off when the DI or PR would have indicated a low water condition. Instead, the boiler (201) was allowed to run to a condition where the water is well below the probe (105) level and then was manually shut-off. In the first time division (703), the system is generally well behaved and the probe (105) is underwater. During the second time division (705), the probe (105) is in a mixture of oily foam and water surge. While the DI has risen, this may not yet constitute a sufficiently high signal to trigger shut-off due to the presence of foam. The question of whether a shutoff should occur relates to the desired sensitivity. In this case, the DI is set to trigger at a higher value. In an alternative embodiment, DI threshold could have been set lower.

During time period (707), in this embodiment, the DI has risen to a level that the boiler would shut off due to a sufficient presence of foam. In this period, the absolute water level may already be a relatively small distance below the probe (generally around 1-1.5 inches) which is the situation of this example, or may still be slightly above the probe (105). This may then still be a "safe" operating volume, but is undesirably low and is showing the presence of a sufficient quantity of foam to indicate a potentially problematic situation.

As should be apparent, the PR does not fall of dramatically until the middle of the period (709) showing that the conductive foam is still in contact the probe resulting in a sufficiently high signal to fool that test. At the end of this window, the PR (and also the DI) would indicate a low water condition and shut off the boiler heat source. However, the water level is over twice as low when the PR would indicate a low water condition as when the DI indicator was triggered based on the presence of foam.

The ability of the low water detector (100) to detect that it is in foam or surge by using the DI is beneficial because it allows the low water detector (100) to more accurately detect a low water condition which is the principle concern of the low water detector (100) and specifically allows the low water detector (100) to detect the low water condition quicker.

As should also be apparent from the comparison of FIGS. 6 and 7, it is further possible to differentiate between being in a foam and being in a surge in an embodiment, by examining the behavior of the PR and DI over time. In the surge situation, once the boiler is shutoff, the water level will generally return to a stable line relatively quickly allowing both PR and DI to stabilize to new values. In the foam case, however, the foam will often lead to the PR remaining relatively high and stable after the shutoff, while the DI can actually increase in value and volatility due to the movement of individual bubbles within the foam and the contact between the probe (105) and the liquid surfaces of those bubbles.

If there appears to have only been surge or light foam (the value of the PR and DI drops off quickly within the delay period), additional water can be safely added and the boiler reignited returning the system to regular operation without a huge concern as to foam conditions. If the PR remains high (or drops off more slowly) while the DI also remains high, during the waiting period, the system is likely to be in a foam condition. In this situation, it may be undesirable to add additional water (which could push the foam into the piping from the boiler). Instead, it may be desirable to first combat the foam. Instead of simply adding water, the low water detection system (100) can instead indicate that there is a foam situation. This situation can result in the delay period being lengthened to attempt to allow the foam to further dissipate before reactivating the boiler (201).

Alternatively, the low water detector (100) may instruct the addition of chemicals in addition to or instead of fill water to attempt to combat the foam. These chemicals may be automatically added to the boiler (201) upon detection of a foam condition. The boiler (201) also may remain off or may enter into a purposeful "testing" condition to determine if the chemicals are resulting in the foam's collapse and failure to reform. Alternatively, the low water detector (100) may combat the foam by providing clean water to try and dilute foam. In a still further alternative embodiment, the boiler (201) could signal that it needs to be serviced allowing personnel to remove the old dirty water, clean the boiler and refill it with clean water to combat the foam.

By detecting the presence of a foam, the low water detector (100) can alert end users of a potential problem and try to combat it before damage due to priming occurs and can allow for low water levels to be detected even when foam is present. With the trend towards higher efficiencies, boilers are being made more compact than in the past. In boilers with small water capacities or in boilers with narrow sections, foaming can be a more common occurrence due to the physical designs of the firebox, water tubes, or heat exchangers. The greater incidence of foam therefore makes its detection more desirable.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method of determining when a fluid level in a vessel is surging, the method comprising:

providing a probe located in a fluid containment vessel and conductively coupled to said fluid, said fluid containment vessel containing a fluid, said fluid having a stable level, and said fluid surging above said stable level;

generating a transmitted signal which passes into said fluid;

detecting said transmitted signal at said probe during a time segment;

repeating said step of detecting to collect a set of detected probe signals, each of which is associated with a different time segment within a period;

determining a probe reading representative of said detected probe signals in said set;

determining a dynamic indicator for said set of detected probe signals, said dynamic indicator indicating variability of said detected probe signals in said set compared to said representative probe reading; and using said dynamic indicator to determine if said fluid is surging over said probe when said probe is located above said stable level or if said probe is below said stable level.

2. The method of claim 1 wherein said vessel comprises a boiler.

3. The method of claim 1 wherein said fluid comprises water.

4. The method of claim 1 wherein said dynamic indicator is computed using a mathematical principle selected from the group consisting of: standard deviation, divided differences, absolute differences, or root mean squared.

* * * * *